(12) United States Patent
Spannheimer

(10) Patent No.: US 9,499,050 B2
(45) Date of Patent: Nov. 22, 2016

(54) VELOCITY-REGULATING SYSTEM HAVING A TOUCH-SENSITIVE CONTROL ELEMENT

(71) Applicant: Bayerische Motoren Werke Aktiengesellschaft, Munich (DE)

(72) Inventor: Helmut Spannheimer, Neukeferloh (DE)

(73) Assignee: Bayerische Motoren Werke Aktiengsellschaft, Munich (DE)

(*) Notice: Subject to any disclaimer, the term of this patent is extended or adjusted under 35 U.S.C. 154(b) by 0 days.

(21) Appl. No.: 14/500,598

(22) Filed: Sep. 29, 2014

(65) Prior Publication Data

US 2015/0014075 A1 Jan. 15, 2015

Related U.S. Application Data

(63) Continuation of application No. PCT/EP2013/056214, filed on Mar. 25, 2013.

(30) Foreign Application Priority Data

Mar. 30, 2012 (DE) .......................... 10 2012 205 263

(51) Int. Cl.
*B60K 31/02* (2006.01)
*B60K 31/04* (2006.01)
(Continued)

(52) U.S. Cl.
CPC .............. *B60K 31/042* (2013.01); *B60K 31/00* (2013.01); *B60K 31/0008* (2013.01);
(Continued)

(58) Field of Classification Search
CPC .................... B60K 2031/0091; B60K 31/042; B60K 31/045; B60K 31/047

USPC ................................. 180/178, 179, 170, 171
See application file for complete search history.

(56) References Cited

U.S. PATENT DOCUMENTS 5,775,451 A * 7/1998 Hull ..................... B60K 31/042
180/170
6,044,321 A * 3/2000 Nakamura ......... B60K 31/0008
180/179

(Continued)

FOREIGN PATENT DOCUMENTS

CN 1380858 A 11/2002
CN 100476902 C 4/2009

(Continued)

OTHER PUBLICATIONS

International Search Report dated Jul. 24, 2013 (Three (3) pages).

(Continued)

*Primary Examiner* — Jeffrey J Restifo
(74) *Attorney, Agent, or Firm* — Crowell & Moring LLP

(57) ABSTRACT

A velocity-regulating system for motor vehicles has an electronic control device that produces control signals for regulating the velocity of the motor vehicle at a pre-specified target velocity and/or at a pre-specified distance from a preceding target object. The velocity-regulating system has an operating element whose actuation causes an intervention that influences the velocity regulation. The operating element is embodied as a touch-sensitive button that, when the button is pressed, produces a first intervention that influences the velocity regulation, and that, when the button is only touched, for the period during which button is touched, produces a second intervention that influences the active velocity regulation. Once the touching has ended, the original velocity regulation is continued.

17 Claims, 1 Drawing Sheet

(51) Int. Cl.
*B60W 50/08* (2012.01)
*B60K 31/00* (2006.01)
*B60W 30/14* (2006.01)
*B60W 30/16* (2012.01)
*B60W 30/18* (2012.01)

(52) U.S. Cl.
CPC ............ *B60W 30/14* (2013.01); *B60W 30/16* (2013.01); *B60W 30/18072* (2013.01); *B60W 50/085* (2013.01); *B60K 2310/20* (2013.01); *B60K 2310/24* (2013.01); *B60K 2310/246* (2013.01); *B60K 2310/248* (2013.01); *B60K 2310/26* (2013.01); *B60K 2350/1024* (2013.01); *B60K 2350/1036* (2013.01); *B60W 2030/1809* (2013.01)

(56) References Cited

U.S. PATENT DOCUMENTS

| | | | |
|---|---|---|---|
| 6,529,814 B2 | 3/2003 | Ishizu et al. | |
| 6,591,181 B2* | 7/2003 | Hellmann | B60K 31/0008 180/179 |
| 6,621,176 B1* | 9/2003 | Nagasaka | B60K 31/042 200/61.91 |
| 7,234,556 B2* | 6/2007 | Pendleton | B60K 31/042 180/170 |
| 7,440,835 B2* | 10/2008 | Shima | B60K 31/0008 180/169 |
| 8,078,382 B2* | 12/2011 | Sugano | B60W 10/06 180/170 |
| 2003/0209376 A1* | 11/2003 | Kustosch | B60K 31/042 180/170 |
| 2004/0020698 A1* | 2/2004 | Gehrke | B60K 31/0008 180/170 |
| 2004/0154848 A1* | 8/2004 | Kitagawa | B60H 1/0065 180/170 |
| 2005/0247497 A1* | 11/2005 | Pendleton | B60K 31/042 180/170 |
| 2005/0257976 A1* | 11/2005 | Moczydlowski | B60K 31/042 180/170 |
| 2006/0131963 A1* | 6/2006 | Katrak | B60K 31/047 307/134 |
| 2007/0213905 A1* | 9/2007 | Funk | B60K 28/02 701/45 |
| 2008/0190681 A1* | 8/2008 | Mayser | B62D 1/046 180/170 |
| 2010/0250066 A1* | 9/2010 | Eckstein | B60K 31/042 701/41 |
| 2015/0014075 A1* | 1/2015 | Spannheimer | B60W 50/085 180/178 |

FOREIGN PATENT DOCUMENTS

| | | |
|---|---|---|
| DE | 10 2007 035 424 A1 | 1/2009 |
| DE | 10 2008 027 120 A1 | 12/2009 |
| DE | 10 2008 029 453 A1 | 12/2009 |
| DE | 10 2010 017 418 A1 | 12/2011 |
| DE | 10 2010 032 358 A1 | 2/2012 |
| EP | 0 930 192 A2 | 7/1999 |
| EP | 1 812 258 B1 | 8/2007 |
| WO | WO 2004/007930 A2 | 1/2004 |

OTHER PUBLICATIONS

German Search Report dated Dec. 3, 2012, with Statement of Relevancy (Six (6) pages).
Chinese Office Action issued in Chinese counterpart application No. 201380017927.X dated Mar. 28, 2016, with English translation (Fourteen (14) pages).

* cited by examiner

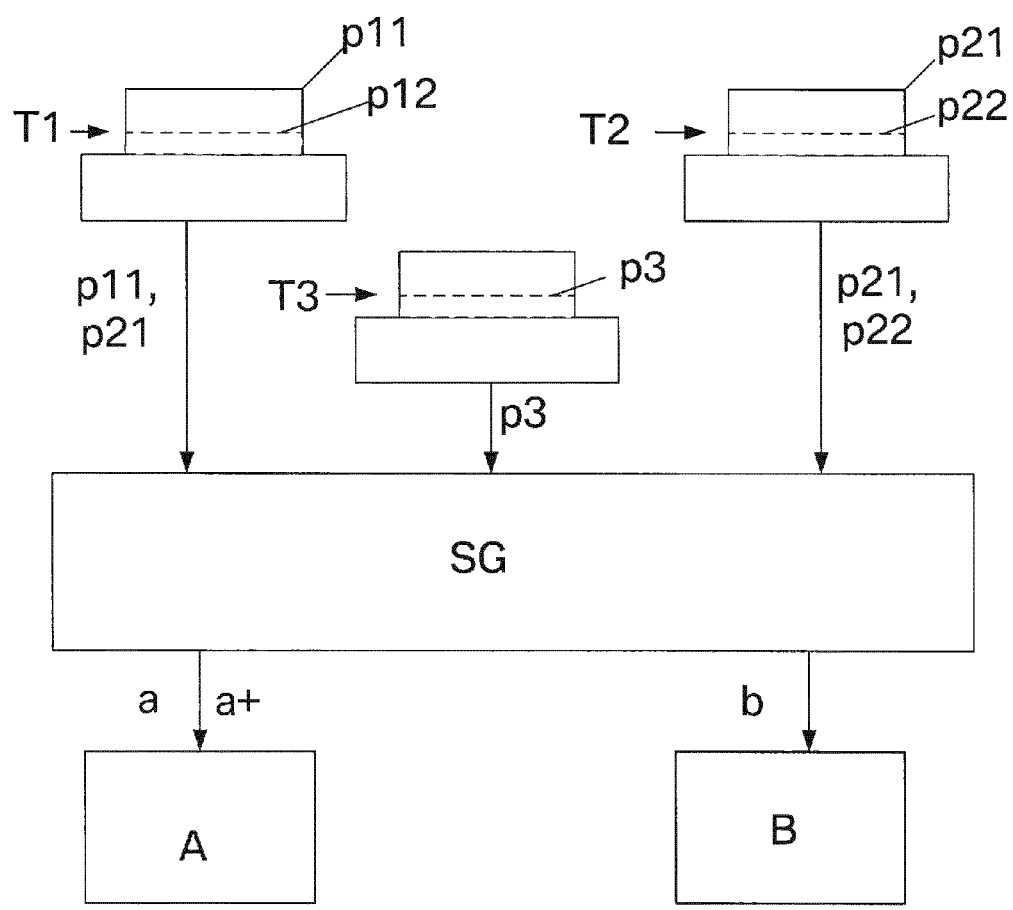

VELOCITY-REGULATING SYSTEM HAVING A TOUCH-SENSITIVE CONTROL ELEMENT

CROSS REFERENCE TO RELATED APPLICATIONS

This application is a continuation of PCT International Application No. PCT/EP2013/056214, filed Mar. 25, 2013, which claims priority under 35 U.S.C. §119 from German Patent Application No. 10 2012 205 263.1, filed Mar. 30, 2012, the entire disclosures of which are herein expressly incorporated by reference.

BACKGROUND AND SUMMARY OF THE INVENTION

The invention relates to a velocity-regulating system for motor vehicles in accordance with the preamble to claim 1.

Motor vehicles having velocity-regulating systems have been known for a long time. The majority of currently available velocity-regulating systems regulate the velocity of the motor vehicle at a pre-specified target velocity. In addition to these driving velocity-regulating systems, today it is also possible to purchase from some manufacturers a velocity-regulating system augmented with distance-regulation. In principle, the generally known velocity regulation, which includes a certain pre-specified target velocity, is augmented with an additional distance-regulating function so that it is also possible to use such distance-related velocity regulation in heavy highway and road traffic. This so-called "distance-related velocity regulation" maintains the pre-specified target velocity if the current traffic lane is clear. If a distance sensor system that is attached to the motor vehicle and that can work in particular based on radar detects a preceding slower target object or (motor) vehicle in its lane, its velocity is adapted, for instance by initiating a suitable braking torque, to the velocity of the preceding motor vehicle such that a pre-specified distance from the target object is maintained. Some such systems can regulate trailing travel all the way to a stop.

In principle, velocity-regulating systems may be turned on, turned off, and temporarily deactivated by means of an operating element that is arranged, for instance, on the steering wheel or on the instrument panel or by means of an operating lever that is arranged, for instance, in the vicinity of the steering wheel. In addition, velocity regulation may also be interrupted due to certain driving or driver maneuvers so that the velocity-regulating system, in principle, is still turned on but does not regulate the velocity during the interruption. Velocity regulation is interrupted by switching to a so-called standby mode, for instance if the appropriate operating element is actuated, if the driver actuates the brake pedal or hand brake, or due to an automatic driving stabilization intervention. In these cases the velocity-regulating system is still turned on, but the regulation is not active.

To reactivate the interrupted velocity regulation at the pre-specified target velocity, the driver must actuate a corresponding operating element, which as a rule is also arranged on the steering wheel or in the vicinity of the steering wheel. Velocity regulation then again regulates at the target velocity that was stored previously. Alternatively, when another operating element is actuated while velocity regulation is in the interrupted state, velocity regulation may be reactivated at the current velocity as the new target velocity. Such a velocity-regulating system is used for instance in the current BMW 5 series automobiles.

Furthermore, EP 1 812 258 B1 discloses a driver assistance system having at least two operating modes, wherein the driver assistance system has an operating element that activates a special safety operating mode of the driver assistance system for the duration of the actuation.

Finally, a velocity-regulating system is also known in which at least one operating element is embodied such that different functions are executed depending on the type of actuation. Thus, DE 10 2008 027 120 A1 discloses a velocity-regulating system having an operating element that is embodied as a touch-sensitive button and that, when the button is pressed, reactivates the interrupted velocity regulation at the stored target velocity. And, when the button is touched, the velocity-regulating system activates a display in which the stored target velocity and/or the stored distance are displayed or enlarges such a display. The display is active for a pre-specified time period.

The object of the invention is to provide a velocity-regulating system that is more user-friendly and more convenient to operate and that permits the driver to make a short-term intervention in the current velocity regulation in a simple manner.

This object is attained using a velocity-regulating system in accordance with patent claim 1. Advantageous refinements are found in the dependent claims.

The inventive velocity-regulating system is based on a known velocity-regulating system for motor vehicles having an electronic control device that produces control signals for regulating the velocity of the motor vehicle at a pre-specified target velocity and/or at a pre-specified distance from a preceding target object, and having at least one operating element whose actuation causes an intervention that influences the velocity regulation.

The invention is based on the idea that, for proactive, efficient driving with a velocity-regulating system, it is frequently necessary to deviate from the set velocity, in particular to decelerate from the set velocity early by coasting in overrun or sail mode. Although one of the aforesaid operating actions (interrupting by actuating an operating element or by brake actuation) leads to the vehicle coasting, reactivation of velocity regulation is only possible using another manual operating step (turning on the operating element).

The invention therefore provides that the at least one operating element is embodied as a touch-sensitive button that, when the button is pressed, produces a first intervention that influences the velocity regulation, and that, when the button is touched, for the period during which button is touched, produces a second intervention that influences the velocity regulation. Once the button is no longer being touched, the original active velocity regulation is continued.

The operating element embodied as a touch-sensitive button is advantageously a first operating element for turning on and/or turning off and/or interrupting the velocity regulation, that, when the button is pressed, interrupts the active velocity regulation and/or deactivates the interrupted velocity regulation and/or activates the deactivated velocity regulation. Moreover, when the button is touched, for the period during which the button is touched, active velocity regulation is interrupted such that no drive torque is produced. Thus, the vehicle is operated in coasting mode for the period during which the button is touched. For safety reasons, however, automatic braking intervention may occur if this appears necessary or logical.

Alternatively or additionally, the second operating element, which is present for specifying the current velocity as the new target velocity, may also be embodied as a touch-sensitive button that, when the button is pressed and the velocity regulation is active, specifies the current target velocity as the new target velocity and/or, if the velocity regulation is interrupted, activates the velocity regulation at the current velocity as the target velocity. Moreover, when the button is touched, for the period during which the button is touched, active velocity regulation is interrupted such that no drive torque is produced. Likewise, alternatively or additionally, the third operating element provided for reactivating the interrupted velocity regulation at the stored target velocity and/or the stored distance may also be embodied as a touch-sensitive button that, when the button is pressed, reactivates the interrupted regulation of the velocity at the stored target velocity and/or the stored distance. Moreover, when the button is touched, for the period during which the button is touched, velocity regulation is interrupted such that no drive torque is produced.

As stated in the foregoing, for safety reasons, required automatic braking intervention may be performed even during the partial interruption of the velocity regulation due to the operating element being touched. Alternatively, however, the velocity regulation may also be completely interrupted for the period during which the button is touched so that neither drive torque nor braking intervention is produced.

In order to be able to coast as early as possible and thus with the greatest energy savings possible, in vehicles that are equipped with an automatic transmission or automated transmission, for the period during which the operating element embodied as a touch-sensitive button is touched, not only can the velocity regulation be interrupted, but also in addition the transmission may be switched to neutral (that is, the clutch is disengaged) and the vehicle may be operated in a so-called sail mode. Thus, there is also no deceleration torque caused by the coasting mode. Once the button is no longer being touched, an appropriate gear is engaged and the disengaged clutch is engaged.

In an analogous embodiment, temporary acceleration may occur due to over-controlling the velocity regulation. In this case, for instance the operating element embodied as a touch-sensitive button is the first operating element for turning on and/or turning off and/or interrupting the velocity regulation, and that, when the button is pressed, interrupts the active velocity regulation and/or deactivates the interrupted velocity regulation and/or activates the deactivated velocity regulation, and that, when the button is touched, for the period during which the button is touched, over-controls the current velocity regulation in that the vehicle is accelerated with a pre-specified acceleration.

Alternatively or in addition, the second operating element, which is present for pre-specifying the current velocity as the new target velocity, may also be embodied as a touch-sensitive button that, when the button is pressed and the velocity regulation is active, pre-specifies the current target velocity as the new target velocity and/or when the velocity regulation is interrupted activates the velocity regulation at the current velocity as the target velocity. Moreover, when the button is touched, for the period during which button is touched, current velocity regulation is over-controlled in that the vehicle is accelerated at a pre-specified acceleration Likewise, alternatively or in addition, the third operating element provided for reactivating the interrupted velocity regulation at the stored target velocity and/or the stored distance may be embodied as a touch-sensitive button that, when the button is pressed, reactivates the interrupted regulation of the velocity at the stored target velocity and/or reactivates the stored distance. Moreover, when the button is touched, for the period during which the button is touched, current velocity regulation is over-controlled in that the vehicle is accelerated at a pre-specified acceleration.

In order to be able to enable temporary deceleration or coasting of the vehicle and temporary acceleration of the vehicle for the period during which a touch-sensitive button provided for this purpose is touched, the velocity regulating system is to be embodied such that at least two of the known operating elements are embodied as touch-sensitive buttons. When the one touch-sensitive button is touched, for the period during which the button is touched, there is intervention in the velocity regulation such that at least no drive torque is produced. And when the other touch-sensitive button is touched, for the period during which the button is touched, there is intervention in the velocity regulation such that the vehicle is accelerated at a pre-specified acceleration.

Other objects, advantages and novel features of the present invention will become apparent from the following detailed description of one or more preferred embodiments when considered in conjunction with the accompanying drawings.

BRIEF DESCRIPTION OF THE DRAWINGS

The invention shall be explained in greater detail in the following using an exemplary embodiment. The only FIGURE depicts a velocity-regulating system having two operating elements embodied as touch-sensitive buttons, each for executing two functions of the velocity regulating system.

DETAILED DESCRIPTION OF THE DRAWINGS

The FIGURE depicts a velocity regulating system having three buttons T1, T2, and T3 that are part of an active velocity regulating system. The velocity regulating system further includes an electronic control device SG that, during free driving, regulates the velocity at a pre-specified target velocity and, during trailing travel (preceding vehicle drives slower than the pre-specified target velocity), regulates the velocity to a pre-specified distance from the preceding vehicle. The velocity is regulated such that the control device SG either transmits a drive torque signal a to a drive unit A for accelerating or a braking signal b to a brake unit B for decelerating the vehicle.

The first operating element T1 is embodied as touch-sensitive button T1, wherein when the button T1 is pressed (p12) and the velocity regulation is in the active mode, due to the signal p12 transmitted to the control device SG the active velocity regulation is interrupted, in the interrupted mode the interrupted velocity regulation is deactivated, and in the deactivated mode the deactivated velocity regulation is activated. If the button T1 is only touched (p11) by the user in the active mode, due to the signal p11 transmitted to the control device SG, for the period during which the button T1 is touched, the active velocity regulation is interrupted such that no drive torque a is produced. However, if there is a drop below a pre-specified minimum distance from a preceding vehicle (e.g. if the preceding vehicle brakes sharply), a braking signal b is also output to the brake unit B to decelerate the vehicle. Once the button T1 is no longer being touched, the previously active velocity regulation at the valid target velocity and the valid distance is resumed.

Furthermore, the second operating element T2 is also embodied as a touch-sensitive button T2, wherein, when the button T2 is pressed (p22), due to the signal p22 transmitted to the control device SG during active velocity regulation, the current target velocity is pre-specified as the new target velocity and regulation is performed at it, and if velocity regulation is interrupted, velocity regulation is reactivated with the current velocity as the new target velocity. If the button T2 is only touched (p21) by the user in the active mode, due to the signal p21 transmitted to the control device SG, for the period during which the button T2 is touched, the current velocity regulation is over-controlled in that the vehicle is accelerated at a pre-specified acceleration a+. Once the button T2 is no longer being touched, the previously active velocity regulation is resumed at the valid target velocity and/or the valid distance.

For the sake of completeness, a third operating element T3 is depicted that is embodied as a simple button T3 that, when the button T3 is pressed, transmits a signal p3 to the control device SG, which then reactivates the interrupted regulation of the velocity at the stored target velocity and/or the stored distance.

Thus, using the inventive velocity regulating system only reduced operating complexity is required for temporary over-controlling of the velocity regulation. This increases the operating convenience of such a system and thus also customer acceptance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A velocity-regulating system for motor vehicles comprising:
   an electronic control device that produces control signals for regulating the velocity of the motor vehicle at a pre-specified target velocity and/or at a pre-specified distance from a preceding target object; and
   an operating element whose actuation causes an intervention that influences the velocity regulation,
   wherein the operating element is embodied as a touch-sensitive button that, when the button is pressed, is configured to produce a first intervention that influences the velocity regulation, and that, when the button is touched, for the period during which button is touched, is further configured to produce a second intervention that influences the active velocity regulation, and
   wherein once the touching has ended, the original velocity regulation is continued.

2. The velocity-regulating system in accordance with claim 1,
   wherein the operating element is a first operating element for turning on and/or turning off and/or interrupting the velocity regulation, and that, when the button is pressed, interrupts the active velocity regulation and/or deactivates the interrupted velocity regulation and/or activates the deactivated velocity regulation, and
   wherein, when the button is touched, for the period during which the button is touched, the active velocity regulation is interrupted such that no drive torque is produced.

3. The velocity-regulating system in accordance with claim 2,
   wherein in that the operating element is a second operating element for specifying a current velocity as a new target velocity, such that, when the button is pressed and the velocity regulation is active, a current target velocity is specified as a new target velocity and/or, if the velocity regulation is interrupted, activates the velocity regulation at the current velocity as the target velocity, and
   wherein, when the button is touched, for the period during which the button is touched, the active velocity regulation is interrupted such that no drive torque is produced.

4. The velocity-regulating system in accordance with claim 2,
   wherein the operating element is a third operating element for reactivating the interrupted velocity regulation at a stored target velocity and/or a stored distance, and that, when the button is pressed, reactivates the interrupted regulation of the velocity at the stored target velocity and/or the stored distance, and
   wherein, when the button is touched, for the period during which the button is touched, the velocity regulation is interrupted such that no drive torque is produced.

5. The velocity-regulating system for a motor vehicle having automatic transmission or automated transmission in accordance with claim 3, wherein when the button is touched, for the period during which the button is touched, velocity regulation is interrupted and the transmission is switched to neutral.

6. The velocity-regulating system for a motor vehicle having automatic transmission or automated transmission in accordance with claim 2, wherein when the button is touched, for the period during which the button is touched, velocity regulation is interrupted and the transmission is switched to neutral.

7. The velocity-regulating system in accordance with claim 2,
   wherein the operating element is a second operating element for pre-specifying a current velocity as a new target velocity, such that, when the button is pressed and the velocity regulation is active, pre-specifies a current target velocity as a new target velocity and/or when the velocity regulation is interrupted activates the velocity regulation at the current velocity as the target velocity, and
   wherein the button is touched, for the period during which button is touched, the current velocity regulation is over-controlled such that the vehicle is accelerated at a pre-specified acceleration.

8. The velocity-regulating system in accordance with claim 2,
   wherein the operating element is a third operating element for reactivating the interrupted velocity regulation at a stored target velocity and/or a stored distance that, when the button is pressed, reactivates the interrupted regulation of the velocity at the stored target velocity and/or the stored distance, and
   wherein, when the button is touched, for the period during which the button is touched, the current velocity regulation is over-controlled such that the vehicle is accelerated at a pre-specified acceleration.

9. The velocity-regulating system in accordance with claim 1,
   wherein in that the operating element is a second operating element for specifying a current velocity as a new target velocity, such that, when the button is pressed and the velocity regulation is active, a current target velocity is specified as a new target velocity and/or, if the velocity regulation is interrupted, activates the velocity regulation at the current velocity as the target velocity, and wherein, when the button is touched, for the period during which the button is touched, the active velocity regulation is interrupted such that no drive torque is produced.

10. The velocity-regulating system in accordance with claim 9,
wherein the operating element is a third operating element for reactivating the interrupted velocity regulation at a stored target velocity and/or a stored distance, and that, when the button is pressed, reactivates the interrupted regulation of the velocity at the stored target velocity and/or the stored distance, and
wherein, when the button is touched, for the period during which the button is touched, the velocity regulation is interrupted such that no drive torque is produced.

11. The velocity-regulating system for a motor vehicle having automatic transmission or automated transmission in accordance with claim 9, wherein when the button is touched, for the period during which the button is touched, velocity regulation is interrupted and the transmission is switched to neutral.

12. The velocity-regulating system in accordance with claim 1,
wherein the operating element is a third operating element for reactivating the interrupted velocity regulation at a stored target velocity and/or a stored distance, and that, when the button is pressed, reactivates the interrupted regulation of the velocity at the stored target velocity and/or the stored distance, and
wherein, when the button is touched, for the period during which the button is touched, the velocity regulation is interrupted such that no drive torque is produced.

13. The velocity-regulating system in accordance with claim 1, wherein, when the button is touched, for the period during which the button is touched, velocity regulation is completely interrupted.

14. The velocity-regulating system in accordance with claim 1,
wherein the operating element is a first operating element for turning on and/or turning off and/or interrupting the velocity regulation, such that, when the button is pressed, interrupts the active velocity regulation and/or deactivates the interrupted velocity regulation and/or activates the deactivated velocity regulation, and
wherein, when the button is touched, for the period during which the button is touched, the current velocity regulation is over-controlled such that the vehicle is accelerated with a pre-specified acceleration.

15. The velocity-regulating system in accordance with claim 1,
wherein the operating element is a second operating element for pre-specifying a current velocity as a new target velocity, such that, when the button is pressed and the velocity regulation is active, pre-specifies a current target velocity as a new target velocity and/or when the velocity regulation is interrupted activates the velocity regulation at the current velocity as the target velocity, and
wherein the button is touched, for the period during which button is touched, the current velocity regulation is over-controlled such that the vehicle is accelerated at a pre-specified acceleration.

16. The velocity-regulating system in accordance with claim 1,
wherein the operating element is a third operating element for reactivating the interrupted velocity regulation at a stored target velocity and/or a stored distance that, when the button is pressed, reactivates the interrupted regulation of the velocity at the stored target velocity and/or the stored distance, and
wherein, when the button is touched, for the period during which the button is touched, the current velocity regulation is over-controlled such that the vehicle is accelerated at a pre-specified acceleration.

17. A velocity-regulating system comprising:
at least two operating elements configured to cause an intervention that influences the velocity regulation,
wherein the at least two operating elements are embodied as touch-sensitive buttons that each, when the button is pressed, is configured to produce an intervention that influences the velocity regulation, and
wherein when the one touch-sensitive button is touched, for the period during which the button is touched, there is intervention in the velocity regulation such that no drive torque is produced, and, when the other touch-sensitive button is touched, for the period during which the button is touched, there is intervention in the velocity regulation such that the vehicle is accelerated at a pre-specified acceleration.

* * * * *